United States Patent
Sun et al.

(10) Patent No.: US 8,189,326 B2
(45) Date of Patent: May 29, 2012

(54) PRODUCT CASE AND AN ELECTRONIC DEVICE USING THE SAME

(75) Inventors: Ligang Sun, Shenzhen (CN); Chuimin Chen, Shenzhen (CN); Taoyong Deng, Shenzhen (CN); Mingzhu Chang, Shenzhen (CN); Jiaxin Zhang, Shenzhen (CN)

(73) Assignee: BYD Company, Ltd., Shenzhen (CN)

( * ) Notice: Subject to any disclaimer, the term of this patent is extended or adjusted under 35 U.S.C. 154(b) by 343 days.

(21) Appl. No.: 12/604,299

(22) Filed: Oct. 22, 2009

(65) Prior Publication Data

US 2010/0110622 A1    May 6, 2010

(30) Foreign Application Priority Data

Oct. 31, 2008  (CN) .................. 2008 2 0213213 U

(51) Int. Cl.
*H05K 5/00*  (2006.01)
*B44C 1/26*  (2006.01)
*B32B 7/00*  (2006.01)

(52) U.S. Cl. .............. 361/679.01; 428/67; 428/119

(58) Field of Classification Search .............. 428/67, 428/119, 138, 174; 220/62.14; 361/679.01–679.45, 361/679.55–679.59, 724–727

See application file for complete search history.

(56) References Cited

U.S. PATENT DOCUMENTS

| | | | | |
|---|---|---|---|---|
| 5,604,006 A * | 2/1997 | Ponchaud et al. | ............ | 428/67 |
| 6,471,908 B1 * | 10/2002 | Beckmann | ............ | 264/515 |
| 6,520,607 B2 * | 2/2003 | Pfaff | ............ | 312/204 |
| 7,248,463 B2 * | 7/2007 | Bander et al. | ............ | 361/679.27 |
| 7,826,219 B2 * | 11/2010 | Chien et al. | ............ | 361/679.55 |
| 2007/0059480 A1 * | 3/2007 | Potok et al. | ............ | 428/67 |
| 2008/0074834 A1 * | 3/2008 | Chien et al. | ............ | 361/683 |
| 2011/0065487 A1 * | 3/2011 | Latto et al. | ............ | 455/575.8 |

* cited by examiner

*Primary Examiner* — Jayprakash N Gandhi
*Assistant Examiner* — Nidhi Desai
(74) *Attorney, Agent, or Firm* — Morgan, Lewis & Bockius LLP

(57) ABSTRACT

The present invention discloses a product case for housing an electronic device, wherein the product case comprising a case body; a decoration layer disposed on the case body; a decorating panel; wherein the surface of the decoration layer is configured with a chamber, and the decorating panel is configured to be inlayed inside the chamber. According to the present invention, the product case is configured with the decoration layer, and the decorating panel is configured to be inlayed inside the chamber. Therefore, the design of the electronic device is improved without influencing the decoration layer. Further, the design of the electronic device case may be customized in accordance with the requirement of the consumer.

10 Claims, 2 Drawing Sheets

PRODUCT CASE AND AN ELECTRONIC DEVICE USING THE SAME

CROSS REFERENCES TO RELATED APPLICATIONS

The present application claims priority to and benefit of Chinese patent Application Serial No. 200820213213.2, filed in the State Intellectual Property Office of the P. R. China on Oct. 31, 2008, the entire contents of which are incorporated herein by reference.

BACKGROUND OF THE INVENTION

1. Field of the Invention

The present invention relates to a product case used in an electronic device, in particular, relates to a product case configured with a decoration layer.

2. Background of the Related Art

The case used in present electronic device is designed to be decorated with leather or other materials. Such electronic device, for example, configured with leather decorated case, has a comfortable feel. Furthermore, extra decoration adds additional value into the product. However, the existing decoration method does not support customized design. For example, the existing decoration method prints the patterns on the surface of a decoration layer. However, the printed patterns may be easily worn out. In addition, it is difficult to configure some special pattern, such as product logo, on the surface of the electronic device case.

SUMMARY OF THE INVENTION

The present invention provides a product case, which supports the customized design.

In one embodiment, a product case for housing an electronic device comprising: a case body, a decoration layer disposed on the case body, and a decorating panel; wherein a surface of the decoration layer is configured with a chamber and the decorating panel is configured to be inlayed inside the chamber. In some embodiment, the decoration layer is made of leather.

The product case further comprises a supporting layer disposed underneath the decoration layer, wherein the supporting layer is made of soft material.

In some embodiment, the case body of the product case further comprises a protrusion disposed underneath the decorating panel, and a surface area of the decorating panel is larger than a surface area of the protrusion.

In another embodiment, an electronic device comprises a main body and a product case as described above, wherein the main body and the product case are configured to fit each other.

According to the present invention, the product case is configured with the decoration layer, and the decorating panel is configured to be inlayed inside the case. Therefore, the design of the electronic device is improved without influencing the decoration layer. Further, the design of the electronic device case may be customized in accordance with the requirement of the consumer.

BRIEF DESCRIPTION OF THE DRAWINGS

Exemplary embodiments of the present invention will be described in detail based on the following figures, wherein.

DETAILED DESCRIPTION OF THE EMBODIMENTS

Figure 1:
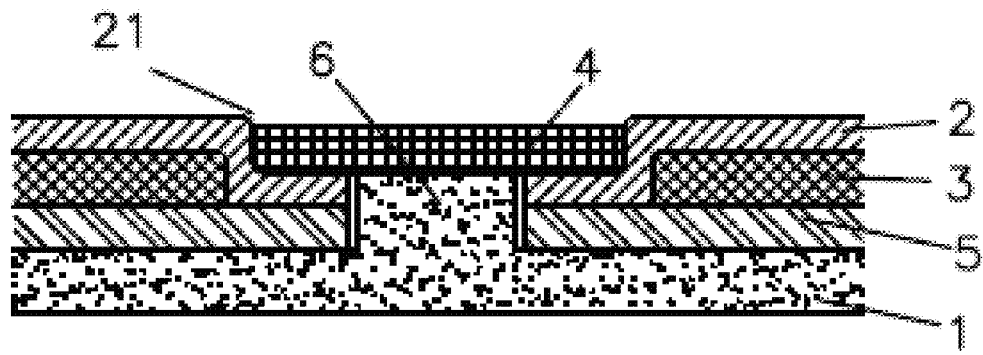
FIG. 1 is a longitudinal section view of the product case in the present invention.

According to the present invention, a product case for housing an electronic device is provided. As shown in FIG. 1, the product case comprises a case body 1, a decoration layer 2 disposed on the case body, and a decorating panel 4; wherein a surface of the decoration layer 2 is configured with a chamber 21, and the decorating panel 4 is configured to be inlayed inside the chamber 21.

According to the present invention, the case body may be made of various materials, for example, plastic material selected from group comprising polyester, polycarbonate (PC), acrylonitrile-butamoldne-styrene (ABS), polymethyl methacrylate (PMMA), and any two combinations thereof.

The case body may be manufactured in various methods, such as cutting plastic substrate, or molding using direct injection. The molding method is well known to those skilled in the art.

The decoration layer may be made of various materials. In some embodiment, the material is chosen with certain toughness, for example, stainless steel, bamboo decorating panel, leather etc. In some embodiment, the decoration layer is made of leather, such as dermal leather and polymer leather (polyurethane leather, polyvinyl chloride leather etc) etc. The opening of the chamber is configured to fit the decorating panel. The height of the decorating panel is configured to the same as, or close to the depth of the chamber. The height of the decorating panel is configured in accordance with the design needs.

The chamber may be formed using leather hot pressing. The method of hot pressing is well known to those skilled in the art.

In some embodiment, the product case further comprises a supporting layer 3 disposed underneath the decoration layer. In some embodiment, the supporting layer 3 is made of soft material, such as foam material.

In the present invention, the product case further comprises a solid layer 5 disposed underneath the supporting layer 3. The solid layer 5 is configured to solid mold the product case, and to prevent the decoration layer made of leather, and the supporting layer made of foam or other soft material from being distorted. In some embodiment, adhesive material is disposed between each layer of the decoration layer, the supporting layer, the solid layer and the case body of the product case for the purpose of solid mold. The adhesive material may be various glues. In some embodiment, the adhesive material may be hot melting glue, which is in solid state under room temperature, and changes to liquid state with certain glutinosity when heated to a certain temperature.

The decorating panel 4 may be any decoration design, and may be made of various materials, for example, metal decoration, glass decoration, product logo etc. The decorating panel may also be any shape. In some embodiment, the decorating panel may be in a regular shape, in particular, in a regular shape with arc edges such as a cylinder, an elliptical cylinder etc. However, the decorating panel in the present invention is not limited to the regular shape.

According to one embodiment of the present invention, as shown in FIG. 1, the case body of the product case further comprises a protrusion disposed underneath the decorating panel, and a surface area of the decorating panel is larger than a surface area of the protrusion. The protrusion is configured to stabilize the decorating panel inlayed inside the chamber. The protrusion and the decorating panel may be adhered together using the hot melting glue.

The protrusion may be molded together with the case body of the product case, and may be any shape of a cylinder. In some embodiment, the protrusion may be in a shape of a cylinder, a square cylinder, a trapezoid etc. The surface of the protrusion is configured to be disposed below the height of the chamber.

Figure 6A:
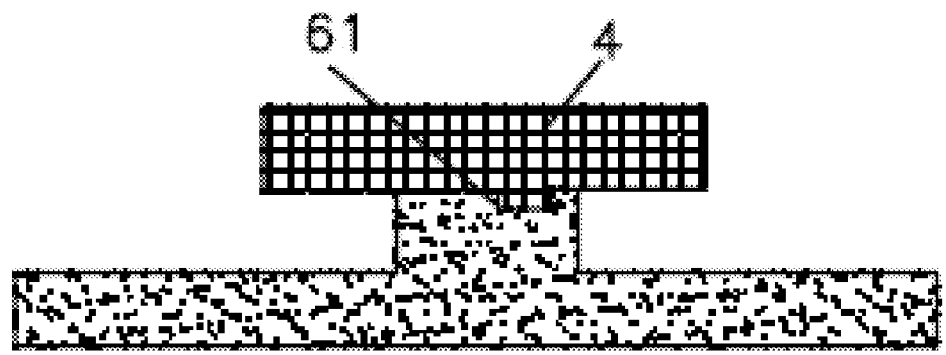
FIG. 6A-FIG. 6B are schematic views of the protrusion and the decorating panel in the present invention.
Figure 6B:
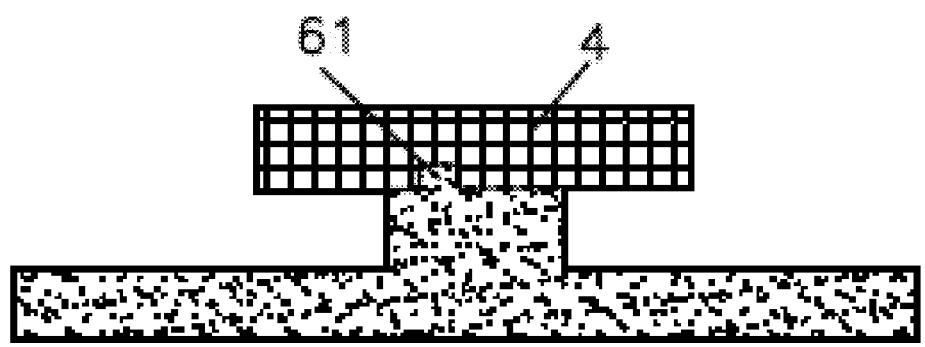

According to the present invention, the surface of the decorating panel may be configured with certain roughness to prevent the sliding of the protrusion and the decorating panel. In some embodiment, the bottom of the decorating panel is jagged. Therefore, an anti-sliding component 61 is configured on the surface of the protrusion to engage with the decorating panel, as shown in FIG. 6A and FIG. 6B.

Hereinafter, one embodiment of the present invention is illustrated in an example of inlaying a product logo in the electronic device case.

The logo is in a shape of a cylinder. The surface diameter of the logo is approximately 10 mm, and the thickness of the logo is approximately 0.3 mm.

A mold is designed according to the structure of the case body and the protrusion on the case. A case configured with a protrusion is then molded. The protrusion is in a shape of a cylinder with a surface diameter of approximately 6 mm and a height of approximately 1.0 mm.

Figure 2:
FIG. 2-FIG. 5 are schematic views of the manufacturing process in the present invention.

The portion on the case to be configured with the leather logo is pressed down to form a chamber and a through hole at the bottom of the chamber, as shown in FIG. 2. The height of the chamber is approximately 0.3 mm, and the bottom surface diameter of the chamber is approximately 10.5 mm. The through hole is configured to hold the protrusion, and the diameter of the through hole is configured to be slightly larger than the surface diameter of the protrusion. According to the embodiment in the present invention, the diameter of the through hole is approximately 7 mm. The method of hot pressing is well known to those skilled in this field.

Figure 3:

The bottom surface of the decoration layer is coated with hot melting glue. Then, the non-pressed part of the decoration layer is filled tightly with a material of foam. The thickness of the foam is approximately 0.3 mm in normal state. The obtained product is shown in FIG. 3.

Figure 4:

Then, a solid layer is obtained in a rigid plastic sheet with a through hole. The solid layer is adhered to the bottom of the foam and the decoration layer. And the through hole of the solid layer corresponds to the through hole of the decoration layer. The obtained product is shown in FIG. 4.

Figure 5:
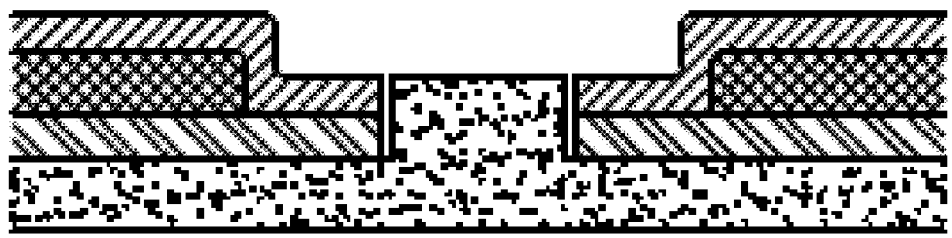

The product obtained in the above step is configured on the top of the protrusion. The solid layer and the case body of the product case are adhered tightly together with glue. The obtained product is shown in FIG. 5. According to the embodiment of the present invention, the surface of the protrusion is at the same plane as the bottom surface of the chamber. However, in some embodiment, the surface of the protrusion may be slightly higher than the bottom surface of the chamber.

Then, the product logo is disposed in the chamber of the decoration layer and adhered to the protrusion to obtain the product case.

According to the present invention, an electronic device comprises a main body and a product case configured to fit the main body. The product case thereof is provided according to the above embodiments of the present invention.

The main body of the electronic device may comprise various function elements. The various elements and their combination and connection are well known to those skilled in this field.

The electronic device of the present invention may be any device, such as a mobile phone, an MP3, a PDA, a notebook computer and a digital camera etc. In some embodiment, the electronic device is a mobile phone.

The foregoing description, for the purpose of explanation, has been described with reference to the specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A product case for housing an electronic device, comprising:
    a case body having an upper surface;
    a decoration layer disposed on the upper surface of the case body, wherein the decoration layer has an upper surface including a concave region; and
    a decorating panel fixed within the concave region of the decoration layer,
    wherein there is a through hole within the concave region of the decoration layer and the case body further includes a protrusion extending upward across the through hole of the decoration layer and disposed underneath the decorating panel, the protrusion having an upper surface that is in physical contact with a bottom surface of the decorating panel.

2. The product case for housing an electronic device according to claim 1, wherein the decoration layer is made of leather.

3. An electronic device comprising a main body and a product case, wherein the product case is according to claim 2.

4. The product case for housing an electronic device according to claim 1, further comprising a supporting layer disposed underneath the decoration layer.

5. The product case for housing an electronic device according to claim 4, wherein the supporting layer is made of soft material.

6. The product case for housing an electronic device according to claim 4, further comprising a solid layer disposed on the upper surface of the case body and underneath the supporting layer.

7. The product case for housing an electronic device according to claim 1, wherein a surface area of the decorating panel is larger than a surface area of the protrusion.

8. The product case for housing an electronic device according to claim 1, wherein the bottom surface of the decorating panel is a rough surface to prevent the decorating panel from sliding on the upper surface of the protrusion.

9. The product case for housing an electronic device according to claim 1, wherein there is a recess on the upper surface of the protrusion and a bump on the bottom surface of the decorating panel and the bump on the bottom surface of the decorating panel is configured to fit into the recess on the upper surface of the protrusion to prevent the decorating panel from sliding on the upper surface of the protrusion.

10. An electronic device comprising a main body and a product case, wherein the product case is according to claim 1.

* * * * *